(12) United States Patent
Akiyama

(10) Patent No.: US 7,628,494 B2
(45) Date of Patent: Dec. 8, 2009

(54) ILLUMINATING APPARATUS AND PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 11/290,560

(22) Filed: Dec. 1, 2005

(65) Prior Publication Data

US 2006/0119802 A1    Jun. 8, 2006

(30) Foreign Application Priority Data

Dec. 7, 2004  (JP) ............................ 2004-353658
Sep. 15, 2005  (JP) ............................ 2005-268118

(51) Int. Cl.
G03B 21/26  (2006.01)
G03B 21/28  (2006.01)
G02B 5/30  (2006.01)
G02B 27/14  (2006.01)
G02B 27/12  (2006.01)

(52) U.S. Cl. ............................ 353/94; 353/20; 353/33; 353/37; 353/57; 353/81; 359/496; 359/636; 359/638; 359/640; 348/757

(58) Field of Classification Search .................. 353/94, 353/20, 33, 37, 57, 85, 81; 359/496, 618, 359/629, 636, 638, 640; 348/750, 757, 758; 349/9

See application file for complete search history.

(56) References Cited

U.S. PATENT DOCUMENTS

| 6,042,234 | A | 3/2000 | Itoh |
| 6,108,132 | A | 8/2000 | Itoh |
| 6,132,047 | A | 10/2000 | Itoh |
| 6,336,724 | B1 * | 1/2002 | Shouji et al. .................. 353/20 |
| 6,341,867 | B1 | 1/2002 | Itoh |
| 6,348,996 | B1 | 2/2002 | Itoh |
| 6,348,997 | B1 | 2/2002 | Itoh |
| 7,040,768 | B2 | 5/2006 | Fujisawa et al. |
| 2002/0145700 | A1 | 10/2002 | Takahashi |
| 2003/0227598 | A1 | 12/2003 | Shouji |

FOREIGN PATENT DOCUMENTS

| JP | A 03-063690 | 3/1991 |
| JP | A 05-181090 | 7/1993 |
| JP | A 05-188325 | 7/1993 |

(Continued)

*Primary Examiner*—Rochelle-Ann J Blackman
(74) *Attorney, Agent, or Firm*—Oliff & Berridge, PLC

(57) ABSTRACT

An illuminating apparatus includes a polarized light beam splitter, a first polarized light source device, and a second polarized light source device. The first polarized light source device has a first light source device, a first polarized light separation prism, and a first polarization element. The second polarized light source device has a second light source device, a second polarized light separation prism, and a second polarization element. The illuminating light flux having the first polarized light component emitted from the first polarized light source device and illuminating light flux having the second polarized light component emitted from the second polarized light source device are both linear polarized light components and have different polled light axis from each other. The polarized light beam splitter synthesizes the illuminating light flux having the first polarized light component emitted from the first polarized light source device and the illuminating light flux having the second polarized light component emitted from the second polarized light source device to emit.

18 Claims, 7 Drawing Sheets

FOREIGN PATENT DOCUMENTS

| | | |
|---|---|---|
| JP | A 08-029734 | 2/1996 |
| JP | A 11-095171 | 4/1999 |
| JP | 2000-180795 | 6/2000 |
| JP | A 2000-155291 | 6/2000 |
| JP | A 2001-125049 | 5/2001 |
| JP | A 2001-264697 | 9/2001 |
| JP | A 2002-072083 | 3/2002 |
| JP | A 2002-182157 | 6/2002 |
| JP | 2002-303933 A | 10/2002 |
| JP | A 2002-341291 | 11/2002 |
| JP | A 2003-066374 | 3/2003 |
| JP | 2003-215704 A | 7/2003 |
| JP | A 2004-177444 | 6/2004 |
| JP | B 3570693 | 7/2004 |
| JP | A 2004-309667 | 11/2004 |
| JP | B 3661392 | 4/2005 |
| WO | WO 98/08118 | 2/1998 |
| WO | WO 2004/104689 A1 | 12/2004 |

* cited by examiner

ILLUMINATING APPARATUS AND PROJECTOR

BACKGROUND

The present invention can relate to an illuminating apparatus and to a projector.

There have been demands for high luminance projectors, and in response to such demands, projectors having two light source devices (so called a 'two-lamp type projector') have been proposed. FIG. 10 is a schematic diagram of a related art two-lamp type projector 900.

As shown in FIG. 10, the related art two-lamp type projector 900 is equipped with a two-lamp type illuminating apparatus 900 that emits approximately parallel light to an illumination target area side, a liquid crystal device 970 that modulates illuminating light flux from the illuminating apparatus 902 in response to image information, and a projection optical system 980 that projects the modulated light by the liquid crystal device 970. The illuminating apparatus 902 is equipped with two light source devices 910a and 910b, a triangular prism 903 that synthesizes light components emitted from the two light source devices 910a and 910b, a collimating lens that approximately collimates the synthesized light by the triangular prism 903, a first lens array 920 having a plurality of first small lenses that divide the light from the collimating lens 918 into a plurality of partial light flux, a second lens array 930 having a plurality of second small lenses corresponding to the first small lenses, a polarization optical system 940 that aligns incident light into one type of linear polarized light to emit, and a superposing lens 950 that superposes each of the partial light flux from the polarization optical system 940 onto the illumination target area (for example, please refer to JP-A-2002-72083).

According to the two-lamp type projector 900 of the related art as described above, since the illuminating apparatus 902 with two light source devices 910a and 910b is used as an illuminating apparatus, projectors with higher brightness could be obtained compared with the projectors according to the related art However, in the above-mentioned two-lamp type projector 900 according to the related art has problems in that, if light emission of the light emitting tube in either one of the two light source devices 910a and 910b is weakened or stopped, distribution of in-plane light intensity on the illumination target area becomes non-uniform, and therefore the quality of a projected image is degraded. These problems are not limited to the two-lamp type projectors, and are also caused in projectors having three or more light source devices.

SUMMARY

An advantage of some aspects of the invention can be to provide an illuminating apparatus preferably usable in a high brightness projector, by which, even if light emission of a light emitting tube in any one of a plurality of light source devices is weakened or stopped, distribution of in-plane light intensity on the illumination target area is prevented from being non-uniform, and projection image quality is prevented from being degraded. Another advantage is to provide a projector equipped with the above-mentioned illuminating apparatus.

In order to achieve the above-mentioned advantage, the inventor of the invention thoroughly investigated the cause that in the two-lamp type projector according to the related art, distribution of in-plane light intensity on the illumination target area became non-uniform if light emission of a light emitting tube in either one of the two light source devices was weakened or stopped. As a result, it has been decided that it is caused by the fact that since the illuminating light flux from the two light source devices is synthesized in the triangular prism with a predetermined angle, it is not completely superposed onto the illumination target area. Based on this knowledge, the inventor reached the invention from the contemplation that completes superposition of the illuminating light flux from the two light source devices would eliminate the above-mentioned problems.

An exemplary illuminating apparatus according to an aspect of the invention can include: a polarized light beam splitter having a first light incident surface and a second light incident surface; a first polarized light source device disposed in front of the first light incident surface; and a second polarized light source device disposed in front of the second light incident surface. The first polarized light source device has a first light source device that emits approximately parallel illuminating light flux, a first polarized light separation prism that has a first polarized light separation sure which, among the illuminating light flux emitted from the first light source device, transmits illuminating light flux having a first polarized light component and reflects illuminating light flux having a second polarized light component, and a first reflective surface that reflects the illuminating light flux having the second polarized light component from the first polarized light separation surface toward a direction parallel to the illuminating light flux having the first polarized light component, and a first polarization element, provided on the light path of the illuminating light flux having the second polarized light component that converts the illuminating light flux having the second polarized light component to illuminating light flux having the first polarized light component to emit. The first polarized light source device emits the illuminating light flux from the fit light source device toward the first light incident surface of the polarized light beam splitter as the illuminating light flux having the first polarized light component. Further, the second polarized light source device has a second light source device that emits approximately parallel illuminating light flux, a second polarized light separation prism that has a second polarized light separation surface which, among the illuminating light flux from the second light source device, transmits illuminating light flux having the first polarized light component and reflects illuminating light flux having the second polarized light component, and a second reflective surface that reflects the illuminating light flux having the second polarized light component from the second polarized light separation surface toward a direction parallel to the illuminating light flux having the first polarized light component, and a second polarization element provided on the light path of the illuminating light flux having the first polarized light component that converts the illuminating light flux having the first polarized light component to illuminating light flux having the second polarized light component to emit and the second polarized light source device emits the illuminating light flux from the second light source device toward the second light incident surface of the polarized light beam splitter as the illuminating light flux having the second polarized light component and the illuminating light flux having the first polarized light component emitted from the first polarized light source device and illuminating light flux having the second polarized light component emitted from the second polarized light source device are both linear polarized light components and have different polarized light axis from each other. The polarized light beam splitter synthesizes the illuminating light flux having the first polarized light component emitted from the first polarized light source device and the illuminating light flux having the second polarized light component emitted from the second polarized light source device to emit.

Therefore, according to the illuminating apparatus according to the above aspect by emitting, from a first polarized light source device and a second polarized light source device, linear polarized light components having different polarized light axis from each other, and entering these linear polarized light components incident respectively, the first light incident surface and the second light incident surface in the polarized light beam splitter, the illuminating light flux emitted from the two light source devices (the first light source device and the second light source device) is emitted from the polarized light beam splitter so as to be completely superposed. Therefore, even if light emission of the light emitting tube in either one of the first and second light source devices is weakened or stopped, distribution of in-plane light intensity on the illumination target area is prevented from being non-uniform, and projection image quality is prevented from being degraded.

It is noted that, by using two or more polarized light source devices according to the above aspect of the invention, not only the two-lamp type projector having two light source devices, but a projector having a plurality of light source devices can be structured.

In an exemplary illuminating apparatus according to the above aspect of the invention, the first light source device has preferably a first ellipsoidal reflector, a first light emitting tube having the light emitting center around the first focal point of the first ellipsoidal reflector, and a first concave lens that emits convergent light from the first ellipsoidal reflector toward the light incident surface in the first polarized light separation prism; and the second light source device has a second ellipsoidal reflector, a second light emitting tube having the light emitting center around the first focal point of the second ellipsoidal reflector, and a second concave lens emitting convergent light from the second ellipsoidal reflector toward the light incident surface in the second polarized light separation prism.

By the above-described structure, since the first and second light source devices emit approximately parallel light flux that is smaller than the ellipsoidal reflectors, miniaturization of the projector may be achieved.

In an exemplary illuminating apparatus according to the aspect of the invention, the first light emitting tube is preferably provided with a first reflector that reflects the light emitted from the first light emitting tube to the illumination target area side toward the first ellipsoidal reflector, and the second light emitting tube is preferably provided with a second reflector that reflects the light emitted from the second light emitting tube to the illumination target area side toward the second ellipsoidal reflector.

By the above-described structure, since the light radiated from the light emitting tubes to the illumination target area side is reflected toward the ellipsoidal reflectors, the size of each of the ellipsoidal reflectors is not required to be set to cover the ends of the illumination target area side of the light emitting tubes. Therefore, each of the ellipsoidal reflectors may be miniaturized, and miniaturization of the projector may be achieved accordingly.

Also, since each of the ellipsoidal reflectors can be miniaturized, the convergence angle or beam spot of the beam converging from the ellipsoidal reflectors toward the second focal point of each of the ellipsoidal reflectors can be reduced in size. Therefore, the size of each of the concave lenses, each of the polarized light separation prisms, and the polled light beam splitter can be further reduced, and the illuminating apparatus can be further miniaturized.

In an exemplary illuminating apparatus according to the aspect of the invention, the first light incident surface of the polarized light beam splitter is preferably bonded to the light emitting surface in the first polarized light source device; and the second light incident surface of the polarized light beam splitter is preferably bonded to the light emitting surface in the second polarized light source device.

In an exemplary illuminating apparatus according to the aspect of the invention, the light incident surface of the first polarized light separation prism is preferably bonded to the light emitting surface of the first concave lens in the first light source device; and the light incident surface of the second polarized light separation prism is bonded to the light emitting surface of the second concave lens in the second light source device.

By the above-described structure, since unnecessary reflections are reduced between the first polarized light separation prism and the first concave lens in the first light source device and between the second polarized light separation prism and the second concave lens in the second light source device, light utilization efficiency is improved and the level of stray light is reduced.

In an exemplary illuminating apparatus according to the aspect of the invention, the polarized light beam splitter and the first polarized light separation prism, the first polarized light separation prism and the first concave lens, the polarized light beam splitter and the second polarized light separation prism, and the second polarized light separation prism and the second concave lens, are preferably disposed apart from each other.

By the above-described structure, position adjustment among each of the optical devices may be accomplished easily. Also, thermal effect to each of the optical devices may be reduced.

In the instance, a antireflection film is preferably coated on each of the first and second light incident surface of the polarized light beam splitter, the light incident surface and the light emitting surface of the first polarized light separation prism, the light incident surface and the light emitting surface of the second polarized light separation prism, the light emitting surface of the first concave lens, and the light emitting surface of the second concave lens.

Thus, occurrence of unnecessary reflections is prevented in the illuminating light flux incident on each of the optical devices, and in the illuminating light flux emitting from each of the optical devices.

An exemplary illuminating apparatus according to the aspect of the invention can further include: a first lens array that has a plurality of fist small lenses that divide the light emitted from the polarized light beam splitter into a plurality of partial light flux; a second lens array that has a plurality of second small lenses corresponding to the plurality of first small lenses of the first lens array, a polarization optical system that aligns the partial light flux from the second lens array into one type of linear polarized light; and a superposing lens that superposes the light from the polarization optical system onto the illumination target area.

By the above-described structure, pursuant to the effect of an integrator optical system consisting of the first lens array, the second lens array, and the superposing lens, the illumination target area is illuminated by the light having a uniform distribution of in-plane light intensity. Also, pursuant to the effect of the polarization optical system, non-polarized light emitted from the polarized light beam splitter can be converted into one type of linear polarized light, thus the illuminating apparatus of the invention is particularly suitable for an electro-optical modulation apparatus of the type that modulates polarized light such as a liquid crystal device.

An exemplary illuminating apparatus according to the aspect of the invention can further include: a power control system that controls the power supplied to the first light emitting tube and the second light emitting tube; wherein, when $W_0$ denotes the power supplied from the power control system to each of the first light emitting tube and the second light emitting tube, respectively, in case the first and second light emitting tubes work, and $W_1$ denotes the power supplied from the power control system to the other light emitting tube which works in case either of the first and second light emitting tubes does not work, the power control system has the function of controlling the power supplied to the first and second light emitting tubes so that the following equation is satisfied: $W_1 > W_0$.

In the two-lamp type projector according to the related art, when the light emitting tube in the light source device of either one of the two light source devices has been burned out (unworking state), the illuminance in the illumination target area is reduced, and thus, the brightness of the projection image is degraded.

However, according to the exemplary illuminating apparatus of the invention, since the power control system has the function of controlling the power supplied to the first and second light emitting tubes so that the following equation is satisfied: $W_1 > W_0$, the power supplied to the other light emitting tube which works in case one light emitting tube in either the first or second light emitting tubes does not work (hereinafter, may be referred to as a 'one-lamp-working state') can be made larger than the power supplied to each of the first light emitting tube and the second light emitting tube in case the first and second light emitting tubes work (hereinafter, may be referred to as a 'two-lamp-working state'), respectively. Therefore, since the light amount from the light emitting tube which is working in case of the one-lamp-working state can be larger than the light amount from each one of the first and second light emitting tubes in case of the two-lamp-working state, respectively, even when the two-lamp-working state is changed to the one-lamp-working state, the illuminance in the illumination target area can be effectively prevented from being lowered. As a result the brightness of the projection image can be effectively prevented from being lowered.

Therefore, according to the exemplary illuminating apparatus according to the aspect of the invention, even if light emission of the light emitting tube in either one of the two light source devices is weakened or died, distribution of in-plane light intensity on the illumination target area is prevented from being non-uniform, and the illuminance in the illumination target area can be effectively prevented from being lowered. As a result, an illuminating apparatus is obtained by which the quality and brightness of the projection image can be effectively prevented from being degraded and lowered.

In an exemplary illuminating apparatus of the invention, the power control system preferably has the function of controlling the power supplied to the first and second light emitting tubes so that the following equation is satisfied: $W_1 = 2W_0$.

By the above-described structure, since the sum of the light amounts of the first and second light emitting tubes in case of the two-lamp-working state can be made equal to the light amount of any one of the first and second light emitting tube which works in case of the one-lamp-working state, the illuminance in the illumination target area in case of the one-lamp-working state can be made approximately equal to the illuminance in the illumination target area in case of the two-lamp-working state. Therefore, even when the two-lamp-working state is changed to the one-lamp-working state, the illuminance in the illumination target area is prevented from being lowered, and thus, the brightness of the projection image is prevented firm being lowered.

In an exemplary illuminating apparatus according to the aspect of the invention, the time required to change the power supplied from the power control system to the first or second light emitting tubes is preferably less than one frame period when the two-lamp-working state is changed to the one-lamp-working state.

By the above-described structure, even when the light emitting tube does not work and the two-lamp-working state is changed to the one-lamp-working state, such fact can be made unnoticeable to an observer. As a result, since it is possible to prevent the situation in which the observer becomes unable to concentrate on the contents due to the fact that the light emitting tube does not work, the exemplary illuminating apparatus of the invention is particularly useful to illuminating apparatuses utilized as projectors for business purposes used in theaters (including theaters corresponding to digital cinemas).

In an exemplary illuminating apparatus according to the aspect of the invention, the illuminating apparatus can further include a lamp state detecting system that detects whether each of the first and second light emitting tubes works or not.

By the above-described structure, it can be easily detected whether each of the first and second light emitting tubes works or not (the lamp state).

In the instance, as the lamp state detecting system, for example, the lamp state detecting system may detect the lamp state of each of the first and second light emitting tubes by measuring the light amount of each of the first and second light emitting tubes. Alternatively, the lamp state detecting system may detect the lamp state of each of the first and second light emitting tubes by measuring the temperature of each of the first and second light emitting tubes or the temperature of a part of each of the fist and second light source devices. Alternatively, the lamp state detecting system may detect the lamp state of each of the first and second light emitting tubes by measuring the power consumption or current consumption of each of the first and second light emitting tubes.

In an exemplary illuminating apparatus according to the aspect of the invention, the illuminating apparatus can further include a first cooling fan that cools the first light source device; a second cooling fan that cools the second light source device; and a cooling fan control system that controls the rotation frequency of the first and second cooling fans; wherein the cooling fan control system has the function of controlling the rotation frequency of the first and second cooling fans based on the power supplied to each of the first and second light emitting tubes by the power control system.

By the above-described structure, since an excessive increase in temperature in the first and second light emitting tubes can be prevented, life of each of the first and second light emitting tubes can be prolonged.

An exemplary projector according to another aspect of the invention can include the illuminating apparatus according to the above aspect; an electro-optical modulation device that modulates the light from the illuminating apparatus in response to image information; and a projection optical system that projects the modulated light by the electro-optical modulation device.

Accordingly, since the exemplary projector according to the aspect of the invention is equipped with the exemplary illuminating apparatus according to the aspect of the invention, is a projector of high luminance, and, even if light emission from the light emitting tube of either of the first and second light source devices is weakened or stopped, the projection image quality is prevented from being degraded.

BRIEF DESCRIPTION OF THE DRAWINGS

The invention will be described with reference to the accompanying drawings, wherein like numbers reference like elements, and wherein.

DESCRIPTION OF EXEMPLARY EMBODIMENTS

Figure 1A:
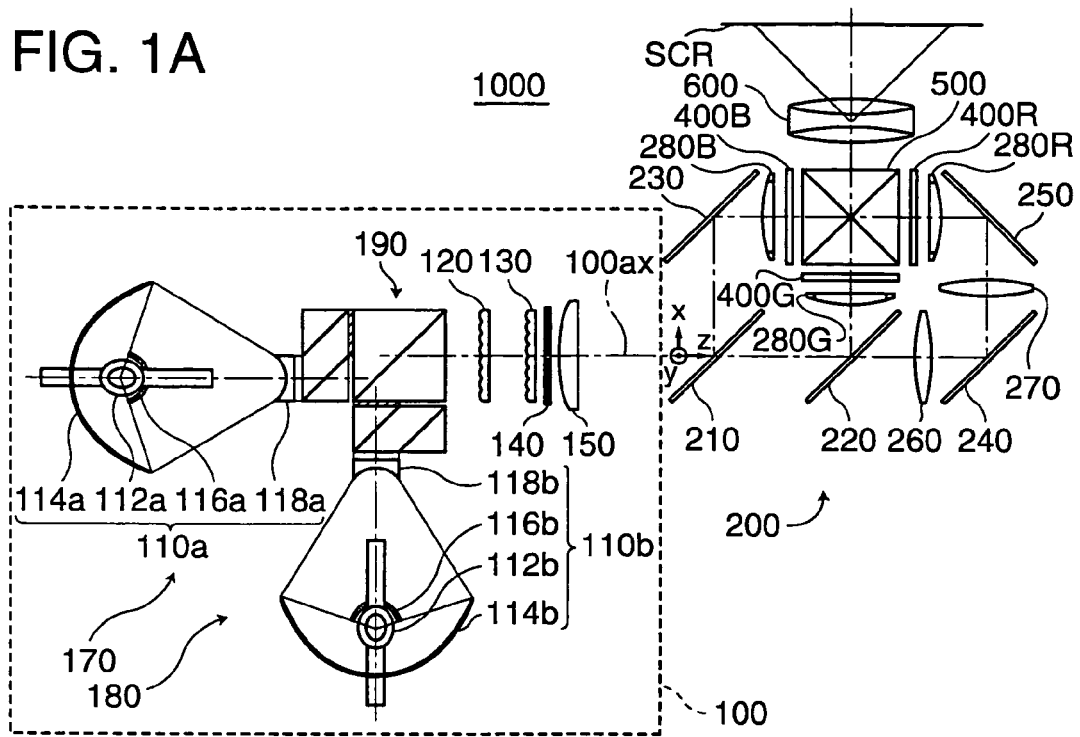
FIGS. 1A to 1D are schematics showing an illuminating apparatus 100 and a projector 1000 according to the first exemplary embodiment.

Hereinafter, an illuminating apparatus and a projector to which exemplary embodiments of the invention are applied will be described below with reference to exemplary embodiments shown in the drawings.

First Exemplary Embodiment

Figure 1B:
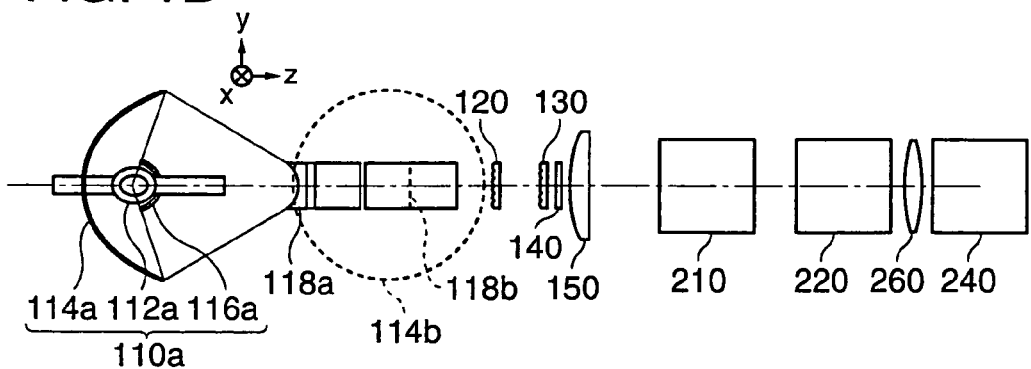
Figure 1C:
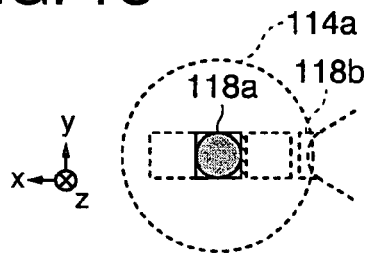
Figure 1D:
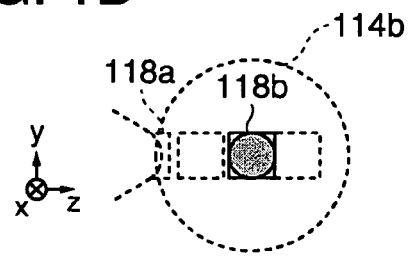
Figure 2:
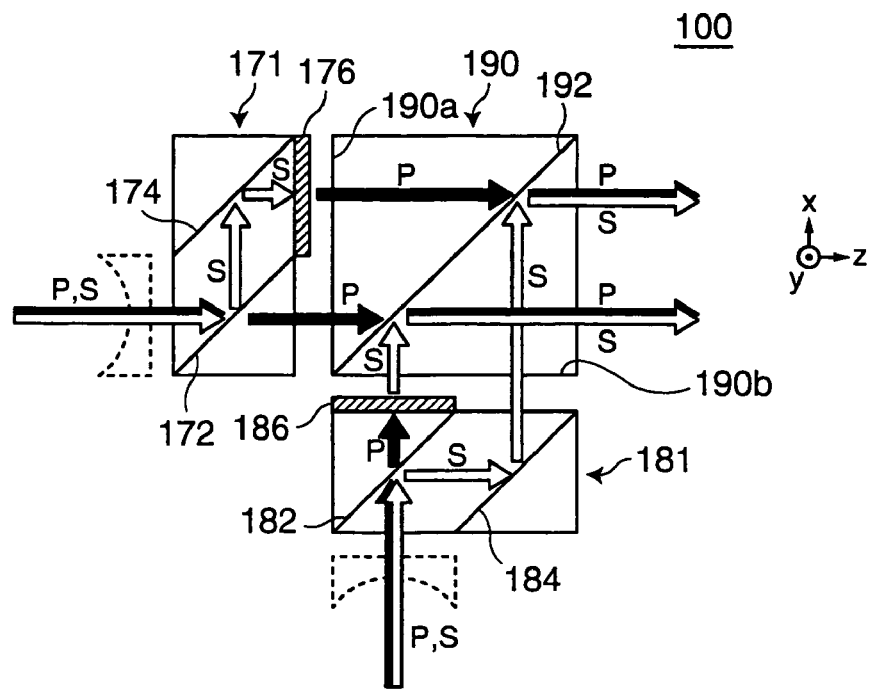
FIG. 2 is a schematic showing an essential part of the illuminating apparatus 100 according to the first exemplary embodiment.
Figure 3:
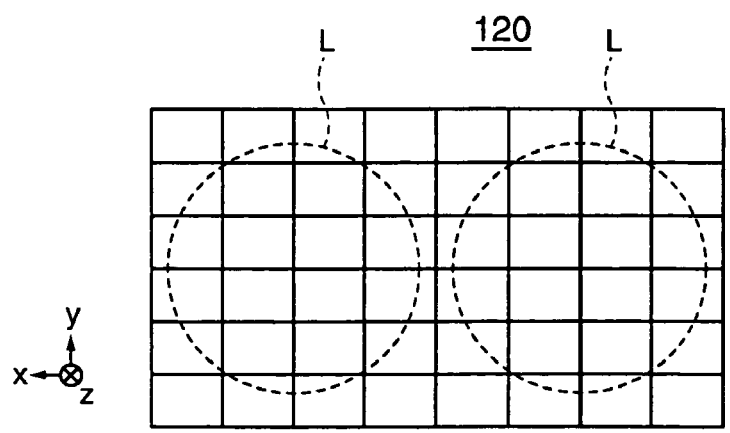
FIG. 3 is a schematic showing a first lens array 120.
Figure 4:
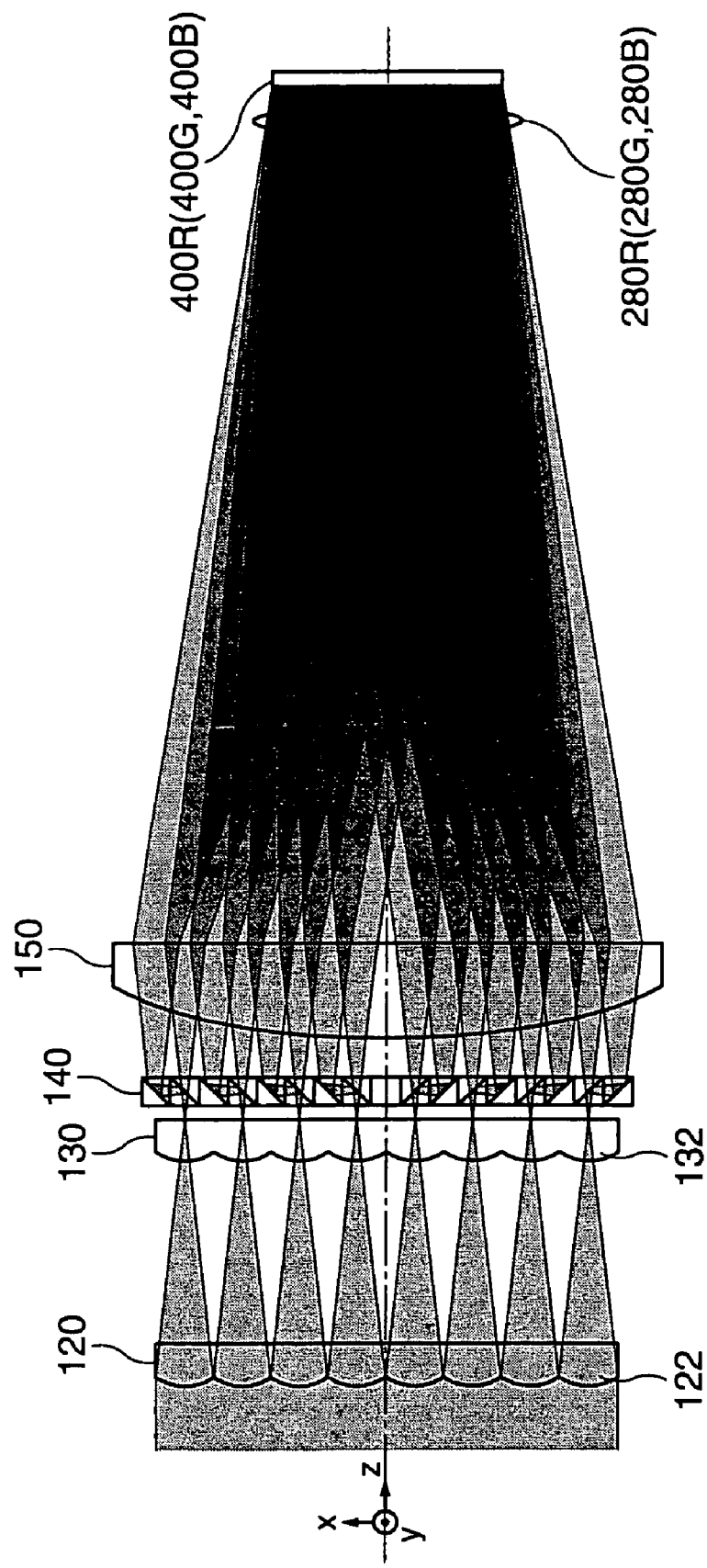
FIG. 4 is a schematic showing light rays in an integrator optical system of the projector 1000 according to the first exemplary embodiment.
Figure 5:
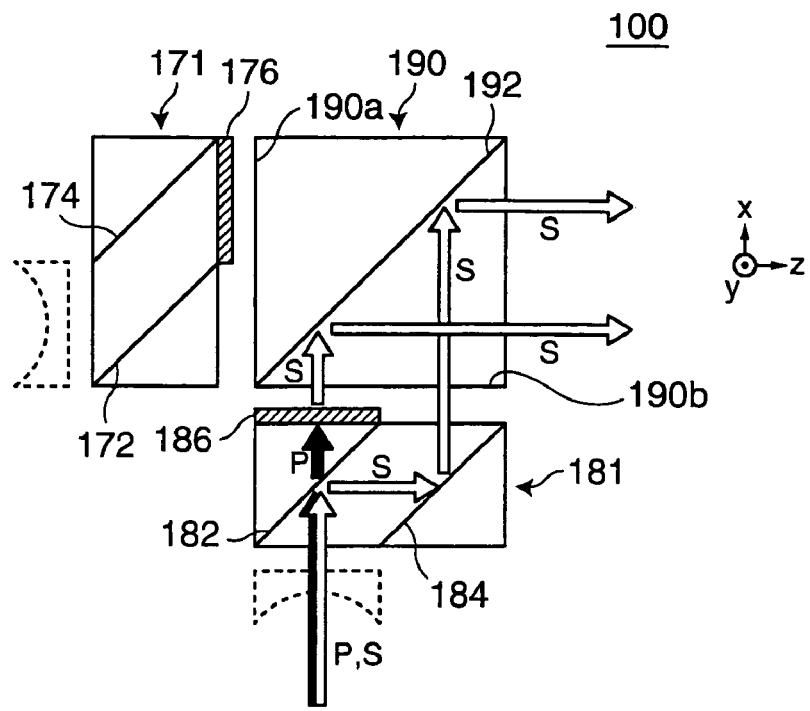
FIG. 5 is a schematic showing the illumination condition when the light emission of the first light emitting tube 112a of the first light source device 110a is stopped.
Figure 6:
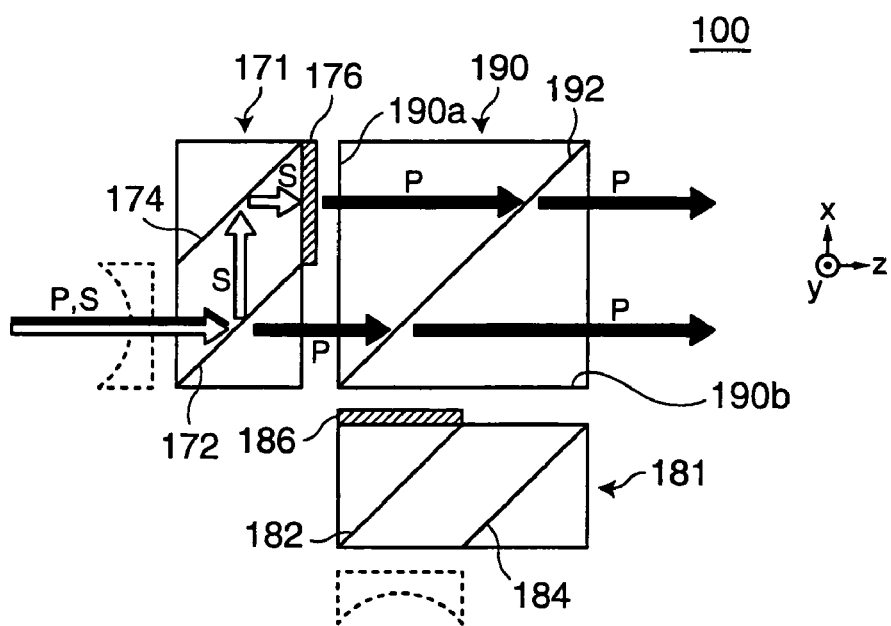
FIG. 6 is a schematic showing the illumination condition when the light emission of the second light emitting tube 112b of the second light source device 110b is stopped.

FIGS. 1A to 1D are schematics showing an illuminating apparatus 100 and a projector 1000 according to the first exemplary embodiment. FIG. 1A is a plan view showing the optical system of the projector 1000, FIG. 1B is a side view showing the optical system of the projector 1000, FIG. 1C is a view showing a first concave lens 118a shown from the side of a first light emitting tube 112a, and FIG. 1D is a view showing a second concave lens 118b shown from the side of a second light emitting tube 112b. FIG. 2 is a plan view showing an essential part of the illuminating apparatus 100 according to the first exemplary embodiment FIG. 3 is a front view of a first lens array 120. FIG. 3 also shows a contour L of illuminating light flux. FIG. 4 is a view showing light rays in an integrator optical system of the projector 1000 according to the first exemplary embodiment FIG. 5 is a view illustrating the illumination condition when light emission of the first light emitting tube 112a in the first light source device 110a is stopped. FIG. 6 is a view illustrating the illumination condition when light emission of the second light emitting tube 112b in the second light source device 110b is stopped.

In the description hereinafter, three directions, which are perpendicular to each other, are defined as the z-axis direction (the direction of the illuminating optical axis 100ax in FIG. 1A), the x-axis direction (parallel to the paper surface in FIG. 1A and perpendicular to the z-axis), and the y-axis direction perpendicular to the paper surface in FIG. 1A and orthogonal to the z-axis), respectively.

As shown in FIG. 1, the projector 1000 according to the first exemplary embodiment is a projector equipped with a so-called two-lamp type illuminating apparatus 100 (the illuminating apparatus 100 according to the first exemplary embodiment); a color-separating and light-guiding optical system 200 that divides illumination flux from the illuminating apparatus 100 into three colors beams and guides them to an illumination target area; three liquid crystal devices 400R, 400G, 400B which modulate three color components divided by the color-separating and light-guiding optical system 200 in response to image information; a cross dichroic prism 500 that synthesizes the color beams modulated by the liquid crystal devices 400R, 400G, 400B; and a projection optical system 600 that projects the light synthesized by the cross dichroic prism 500 onto a projection surface of a screen SCR or the like.

As shown in FIGS. 1 and 4, the illuminating apparatus 100 according to the first exemplary embodiment has: a first polarized light source device 170 and a second polarized light source device 180; a polarized light beam splitter 190 that synthesizes illuminating light flux emitted from the first and second polarized light source devices 170 and 180 to emit; a first lens array 120 having a plurality of first small lenses 122 that divide the light emitted from the polarized light beam splitter 190 into a plurality of partial light flux; a second lens array 130 having a plurality of second small lenses 132 corresponding to the plurality of first small lenses 122 of the first lens array 120; a polarization optical system 140 that aligns the partial light flux from the second lens array 130 into one type of linear polarized light to emit; and a supposing lens 150 that superpose the light from the polarization optical system 140 onto the illumination target area. The first and second polarized light source devices 170 and 180, and the polarized light beam splitter 190 will be described below.

As shown in FIG. 3, the first lens array 120 is configured so that the first small lenses 122, having an approximately rectangular shape when viewed from the z-axis direction, are disposed on a plane that is perpendicular to the z-axis. Each of the first small lenses 122 of the first lens array 120 divides the illuminating light flux emitted from the polarized light beam splitter 190 into a plurality of partial light flux. The contour shape of each of the first small lenses 122 of the first lens array 120 is set so as to be approximately similar to the shape of the image forming area of each of the liquid crystal devices 400R, 400G, 400B. For example, if the aspect ratio of the image forming area of each of the liquid crystal devices 400R, 400G, 400B is 4:3, the aspect ratio of each of the first small lenses 122 is also set to 4:3.

The second lens array 130 has an approximately same structure as the first lens array 120, and structured so that the second small lenses 132 are disposed on a plane perpendicular to the z-axis. The second lens array 130 has the function of; together with the superposing lens 150, forming the image of each of the first small lenses 122 of the first lens array 120 around the image forming area of the liquid crystal devices 400R, 400G, 400B.

The color-separating and light-guiding optical system 200 has a first dichroic mirror 210, a second dichroic mirror 220, reflective mirrors 230, 240, 250, and relay lenses 260 and 270.

The color-separating and light-guiding optical system 200 has the function of dividing the illuminating light flux emitted from the superposing lens 150 into three color light components, i.e., a red light component, a green light component, and a blue light component, and guiding each light beam to each of the liquid crystal devices 400R, 400G, 400B, which are illumination targets.

Each of the first and second dichroic mirrors 210 and 220 is an optical device having a wavelength-selective film formed on a substrate, which reflects light flux of a predetermined wavelength range and transmits light flux of other wavelength ranges. The first dichroic mirror 210 is a mirror that reflects the blue light component while transmitting the green and red light components. The second dichroic mirror 220 is a mirror that reflects the green light component while transmitting the red light component.

The blue light component reflected by the first dichroic mirror 210 is further reflected by the reflective mirror 230, passes through a condenser lens 280B, and illuminates the image forming area of the liquid crystal device 400B for blue light component.

The condenser lens 280B collects the plurality of partial light flux from the superposing lens 150 so that each of them illuminates the image forming area of the liquid crystal device 400B for blue light component. Usually, each partial light flux is set so as to become approximately parallel light flux. Condenser lenses 208G and 280R, each of which is disposed in front of the other liquid crystal devices 400G and 400R, respectively, are structured similar to the condenser lens 280B.

The green light component that has passed through the first dichroic mirror 210 is reflected by the second dichroic mirror 220, and passes through the condenser lens 280G to illuminate the image forming area of the liquid crystal device 400G for green light component. On the other hand, the red light component that has passed through the first dichroic mirror 210 is transmitted through the second dichroic mirror 220, and passes through the relay lens 260, the reflective mirror 240 on the incident-light side, the relay lens 270, the reflective mirror 250 on the light-emitting side and the condenser lens 280R to illuminate the image forming area of the liquid crystal device 400R for red light component. The relay lenses 260 and 270 and the reflective mirrors 240 and 250 have the function of guiding the red light component transmitted through the second dichroic minor 220 to the liquid crystal device 400R.

Since the length of the optical path of the red light component is longer than the length of the optical path of any other color light beams, the relay lenses 260 and 270 and the reflective mirrors 240 and 250 as described above are used in the optical path of the red light component in order to prevent reduction in light utilization efficiency due to a divergence of light or the lie. That is, the relay lenses 260 and 270 and the reflective mirrors 240 and 250 are used in order to convey the partial light flux incident on the relay lens 260 to the condenser lens 280R in its entirety. The projector 1000 according to the first exemplary embodiment is configured as described above because the length of the optical path of the red light component is long. However, the length of the optical path of the blue light component may be made long so that the relay lenses 260 and 270 and the reflective mirrors 240 and 250 are used for the optical path of the blue light component.

Each of the liquid crystal devices 400R, 400G, 400B modulates the incident illuminating light flux in response to image information, and is the illumination target of the illuminating apparatus 100. It is noted that, although not shown herein, an incident-light side polarizing plate is interposed between each of the condenser lenses 280R, 280C 280B and each of the liquid crystal devices 400R, 400G, 400B, respectively, and a light-emitting side polarizing plate is interposed between each of the liquid crystal devices 400R, 400G, 400B and the cross dichroic prism 500, respectively. Thereafter each incident light beam is optically modulated by the incident-light side polarizing plates, liquid crystal devices 400R, 400G, 400B, and the light-emitting side polarizing plates.

Each of the liquid crystal devices 400R, 400G, 400B is formed such that liquid crystal which is an electro-optical material is sealed between a pair of light transmissive glass substrates, and modulates the polarization orientation of one type of linear polarized light emitted from the incident-light side polarizing plate in response to given image information by using, for example, poly-silicon TFT as a switching device.

The cross dichroic prism 500 is an optical device that forms a color image by synthesizing optical images modulated for each light beam emitted from the light-emitting side polarizing plates. The cross dichroic prism 500 is formed by bonding four rectangular prisms and is approximately square-shaped in plan view. A dielectric multi-layered film is formed at each of the interfaces having an approximately X-shape on which the rectangular prisms are bonded to each other. The dielectric multi-layered film formed at one side of the interface having an approximately X-shape reflects a red light component, and the dielectric multi-layered film formed at another side of the interface reflects the blue light component. The red and blue light components are reflected by the dielectric multi-layered films, and aligned with the traveling direction of the green light component, so that the three light components are synthesized.

The color image emitted from the cross dichroic prism 500 is enlarged and projected by the projection optical system 600 to form a large screen image on the screen SCR.

The illuminating apparatus 100 according to the fist exemplary embodiment has the first polarized light source device 170 and the second polarized light source device 180, and the polarized light beam splitter 190 that synthesizes illuminating light flux emitted from the first polarized light source device 170 and the second polarized light source device 180 to emit. Hereinafter, the structures of the first polarized light source device 170, the second polarized light source device 180, and the polarized light beam splitter 190 will be described.

As shown in FIGS. 1 and 2, the first polarized light source device 170 has a first light source device 110a that emits an approximately parallel illuminating light flux, a first polarized light separation prism 171 that divides the illuminating light flux from the first light source device 110a into illuminating light flux having a P-polarized light component and illuminating light flux having an S-polarized light component, a first λ/2 plate 176 serving as a first polarization element, provided on the light emission surface of the fist polarized light separation prism 171, that converts the illuminating light flux having the S-polarized light component into an illuminating light flux having the P-polarized light component.

The first light source device 110a has, as shown in FIGS. 1A to 1D, a first ellipsoidal reflector 114a, a first light emitting tube 112a having the light emitting center around the first focal point of the first ellipsoidal reflector 114a, and a first concave lens 118a that converts the convergent light reflected by the first ellipsoidal reflector 114a into the collimated light and emits the collimate light toward a light incident surface of the first polarized light separation prism 171. The first light emitting tube 112a is equipped with a first auxiliary mirror 116a as a first reflector that reflects the light emitted from the first light emitting tube 112a to the illumination target area toward the first ellipsoidal reflector 114a. Concretely, the light reflected by the first auxiliary mirror 116a travels to the first light emitting tube 112a and emits toward the first ellipsoidal reflector 114a through the first light emitting tube 112a illumination target area as with the light which is emitted from the first light emitting tube 112a directly to the first ellipsoidal reflector 114a.

The first polarized light separation prism 171 has, as shown in FIG. 2, a first polarized light separation surface 172 that transmits, among the illumination light flux from the first light source device 110a, illuminating light flux having the P-polarized light component and reflects illuminating light flux having the S-polarized light component; and a first reflective surface 174 that reflects the illuminating light flux having the S-polarized light component from the first polarized light separation surface 172 in a direction parallel to the illuminating light flux having the P-polarized light component.

The first $\lambda/2$ plate 176 is provided in the light path of the illuminating light flux having the S-polarized light component on the light-emitting side of the first polarized light separation prism 171.

The second polarized light source device 180 has, as shown in FIGS. 1 and 2, the second light source device 110b that emits approximately parallel illuminating light flux; the second polarized light separation prism 181 that divides the illuminating light flux from the second light source device 110b into illuminating light flux having the P-polarized light component and illuminating light flux having the S-polarized light component; and a second $\lambda/2$ plate 186 serving as a second polarization element that converts the illuminating light flux having the P-polarized light component to illuminating light flux having the S-polarized light component.

The second light source device 110b has, as shown in FIGS. 1A to 1D, a second ellipsoidal reflector 114b; a second light emitting tube 112b having the light emitting center around the first focal point of the second ellipsoidal reflector 114b; and a second concave lens 118b that converts the convergent light reflected by the second ellipsoidal reflector 114b into the collimated light and emits the collimated light toward the light incident surface of the second polarize light separation prism 181. The second light emitting tube 112b is equipped with a second auxiliary mirror 116b serving as a second reflector that reflects the light emitted from the second light emitting tube 112b to the illumination target area toward the second ellipsoidal reflector 114b. Concretely, the light reflected by the second auxiliary minor 116b travels to the second light emitting tube 112b and emits toward the second ellipsoidal reflector 114b through the second light emitting tube 112b illumination target area as with the light which is emitted from the second light emitting tube 112b directly toward the second ellipsoidal reflector 114b.

The second polarized light separation prism 181 has, as shown in FIG. 2, a second polarized light separation surface 182 that transmits, among the illumination light flux from the second light source device 110b, illuminating light flux having the P-polarized light component and reflects illuminating light flux having the S-polarized light component; and a second reflective surface 184 that reflects the illuminating light flux having the S-polarized light component from the second polarized light separation surface 182 in a direction parallel to the illuminating light flux having the P-polarized light component.

The second $\lambda/2$ plate 186 is provided for the light path of the illuminating light flux having the P-polarized light component in the light-emitting side of the second polarized light separation prism 181.

The polarized light beam splitter 190 is formed by bonding a triangular prism having a first light incident surface 190a and another triangular prism having a second light incident surface 190b, and is approximately square-shaped in plan view. At the approximately X-shaped interface of the polarized light beam splitter 190 where the triangular prisms are bonded to each other, a polarized light separation film 192 that transmits illuminating light flux having the P-polarized light component and reflects illuminating light flux having the S-polarized light component is formed. The illuminating light flux having the P-polarized light component, which is emitted from the first polarized light source device 170 and enters the first light incident surface 190a, is transmitted by the polarized light separation film 192. The illuminating light flux having the S-polarized light component, which is emitted from the second polarized light source device 180 and enters the second light incident surface 190b, is reflected by the polarized light separation film 192. Accordingly, the illuminating light flux having the P-polarized light component emitted from the first polarized light source device 170 and the illuminating light flux having the S-polarized light component emitted from the second polarized light source device 180 are synthesized and emitted from the polarized light beam splitter 190.

According to the illuminating apparatus 100 according to the first exemplary embodiment structured as described above, the first polarized light source device 170 and the second polarized light source device 180 emit linear polarized light components having different polarized light axis from each other, and these linear polarized light components enter the first light incident surface 190a and the second light incident surface 190b in the polarized light beam splitter 190, respectively, so that, from the polarized light beam splitter 190, the illuminating light flux from the two light source devices (the first light source device 110a and the second light source device 110b) is emitted so as to be completely superposed. Therefore, as shown in FIGS. 5 and 6, even if light emission from the light emitting tube in either one of the first and second light source devices 110a and 110b is weakened or stopped, distribution of in-plane light intensity on the illumination target area is prevented from being non-uniform, and projection image quality is prevented from being degraded. As a result, the projector 1000 equipped with the illuminating apparatus 100 is capable of preventing projection image quality from being degraded.

It is noted that, by using two or more illuminating apparatuses 100 according to the first exemplary embodiment, not only the two-lamp type projector having two light source devices, but a projector having four or more light source devices can be structured.

In the illuminating apparatus 100 according to the first exemplary embodiment, the first light source device 110a has the first ellipsoidal reflector 114a; the first light emitting tube 112a having the light emitting center around the first focal point of the first ellipsoidal reflector 114a; and the first concave lens 118a that converts the convergent light from the first ellipsoidal reflector 114a into the collimated light and emits the collimated light toward the light incident surface of the first polarized light separation prism 171. The second light source device 110b has the second ellipsoidal reflector 114b; the second light emitting tube 112b having the light emitting center around the first focal point of the second ellipsoidal reflector 114b; and the second concave lens 118b that converts the convergent light from the second ellipsoidal reflector 114b into the collimated light and emits the collimated light toward the light incident surface of the second polarized light separation prism 181.

Accordingly, since each of the first and second light source devices 110a and 110b emits parallel light flux that is smaller than each of the ellipsoidal reflectors 114a and 114b, respectively, miniaturization of the projector may be achieved. In addition, since the first concave lens 118a and the second concave lens 118b can give the first polarized light separation surface 172 and second polarized light separation surface 182 the incident light with angle of incidence of which variation is small, the first polarized light separation surface 172 and second polarized light separation surface 182 can transmit or reflect the light with accuracy. Accordingly, even though the illuminating apparatus 100 is compact size, the illuminating apparatus 100 can emit illuminating light flux of which distribution of in-plane light intensity on the illumination target area is uniform.

Also, in the illuminating apparatus 100 according to the first exemplary embodiment, the first light emitting tube 112a is equipped with the auxiliary minor 116a that reflects the light emitted from the first light emitting tube 112a to the illumination target area side toward the first ellipsoidal reflector 114a. Also, the second light emitting tube 112b is equipped with the auxiliary mirror 116b that reflects the light emitted from the second light emitting tube 112b to the illumination target area side toward the second ellipsoidal reflector 114b.

Accordingly, since the light radiated from each of the light emitting tubes 112a and 112b to the illumination target area side is reflected toward each of the ellipsoidal reflectors 114a and 114b, respectively, the size of each of the ellipsoidal reflectors 114a and 114b is not required to be set to cover the ends of the illumination target area side of each of the light emitting tubes 112a and 112b. Therefore, each of the ellipsoidal reflectors 114a and 114b may be miniaturized, and projector may be miniaturized accordingly. Also, since each of the ellipsoidal reflectors 114a and 114b can be miniaturized, the convergence angle or beam spot of the beam converging from each of the ellipsoidal reflectors 114a and 114b toward the second focal point of each of the ellipsoidal reflectors 114a and 114b can be reduced in size. Therefore, the size of each of the concave lenses 118a and 118b, the first and second polarized light separation prisms 171 and 181, and the polarized light beam splitter 190 can be further reduced, and the illuminating apparatus can be further miniaturized.

In the illuminating apparatus according to the first exemplary embodiment the polarized light beam splitter 190 and the first polarized light separation prism 171, the first polarized light separation prism 171 and the first concave lens 118a, the polarized light beam splitter 190 and the second polarized light separation prism 181, and the second polarized light separation prism 181 and the second concave lens 118b, are disposed apart from each other, and therefore, position adjustment among each of the optical devices may be accomplished easily. Also, thermal effect to each of the optical devices may be reduced.

It is noted that although not shown herein a antireflection film is coated on each of the first and second light incident surfaces 190a and 190b of the polarized light beam splitter 190, the light incident surface and the light emitting surface of the first polarized light separation prism 171, the light incident surface and the light emitting surface of the second polarized light separation prism 181, the light emitting surface of the first concave lens 118a, and the light emitting surface of the second concave lens 118b.

Furthermore, as described above, the illuminating apparatus 100 according to the first exemplary embodiment has: the first lens array 120 having the plurality of first small lenses 122 that divide the light emitted from the polarized light beam splitter 190 into a plurality of partial light flux; the second lens array 130 having the plurality of second small lenses 132 corresponding to the plurality of first small lenses 122 of the first lens array 120; the polarization optical system 140 that aligns the partial light flux from the second lens array 130 into one type of linear polarized light to emit; and the superposing lens 150 that superposes the light from the polarization optical system 140 onto the illumination target area.

Accordingly, pursuant to the effect of an integrator optical system consisting of the first lens array 120, the second lens array 130, and the superposing lens 150, as shown in FIG. 4, the illumination target area is illuminated by the light having a uniform distribution of in-plane light intensity. Also, pursuant to the effect of the polarization optical system 140, non-polarized light emitted from the polarized light beam splitter 190 can be converted into one type of linear polarized light, thus the exemplary illuminating apparatus of the invention is particularly suitable for an electro-optical modulation apparatus of the type that modulates polarized light components such as a liquid crystal devices.

The first polarized light source device 170, the second polarized light source device 180, and the polarized light beam splitter 190 in the illuminating apparatus 100 according to the first exemplary embodiment have been described so far. The illuminating apparatus 100 according to the first exemplary embodiment has additional characteristics as described below.

Figure 7:
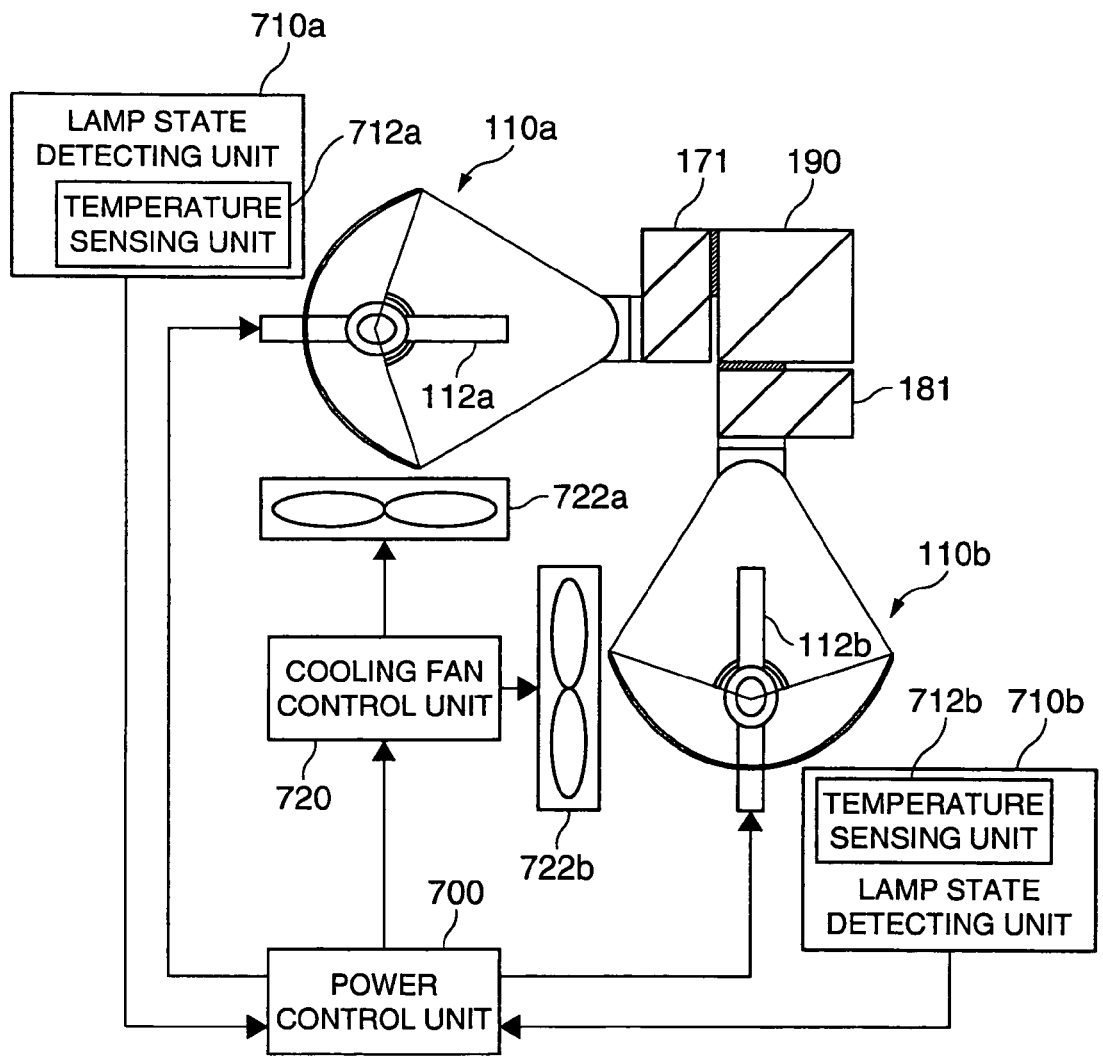
FIG. 7 is a functional block diagram illustrating the illuminating apparatus 100 according to the first exemplary embodiment.

FIG. 7 is a functional block diagram illustrating the illuminating apparatus 100 according to the first exemplary embodiment. It is noted that in FIG. 7, optical devices disposed behind the polarized light beam splitter 190 on the light path are omitted from the drawing.

Table 1 is shown to describe the effect of the illuminating apparatus 100 according to the first exemplary embodiment. More specifically, Table 1 shows a relation between the power $W_0$ supplied from a power control system 700 to the first light emitting tube 112a and the second light emitting tube 112b respectively in case of the 'two-lamp-working' state, and the power $W_1$ supplied from the power control system 700 to either the first light emitting tube 112a or the second light emitting tube 112b which works, in case of the 'one-lamp-working' state.

It is noted that in the illuminating apparatus 100 according to the first exemplary embodiment, the two-lamp-working state refers to the state in which both the first light emitting tube 112a and the second light emitting tube 112b works, and the 'one-lamp-working' state refers to the state in which the first light emitting tube 112a works and the second light emitting tube 112b does not work.

TABLE 1

| Two-lamp-working state | | One-lamp-working state |
|---|---|---|
| Power $W_0$ supplied to each of the light emitting tubes | 2 $W_0$ | Power $W_1$ supplied to the light emitting tube which works |
| 100 W | 200 W | 150 W |

The illumining apparatus 100 according to the first exemplary embodiment is further equipped with a power control system 700, a lamp state detecting system 710a and 710b, a first cooling fan 722a, a second cooling fan 722b, and a cooling fan control system 720.

The power control system 700 has the function of controlling the power supplied to the first and second light emitting tubes 112a and 112b.

In the instance, designating $W_0$ as the power supplied from the power control system 700 to each of the first and second light emitting tubes 112a and 112b, respectively, and $W_1$ as the power supplied from the power control system 700 to the other light emitting tube which works when either one of the first and second light emitting tubes 112a and 112b does not work, the values of $W_0$ and $W_1$ are set as shown in Table 1 in the illuminating apparatus 100 according to the first exemplary embodiment.

In other words, in the illuminating apparatus 100 according to the first exemplary embodiment, as shown in Table 1, the power $W_0$ supplied from the power control system 700 to each of the first and second light emitting tubes 112a and 112b in case of the two-lamp-working state is set to 100 W, whereas the power $W_1$ supplied from the power control system 700 to the light emitting tube which works (the first light emitting tube 112a) in case of the one-lamp-working state is set to 150 W.

The lamp state detecting system 710a is equipped with a temperature sensing element 712a disposed around the first light source device 110a, and has the function of detecting, based on the detection result by the temperature sensing element 712a, whether the first light emitting tube 112a works or not. It is noted that although the temperature sensing element 712a, which is disposed around the first light source device 110a, measures the temperature of a part of the first light source device 110a, the invention is not limited thereto. The temperature sensing element 712a may be directly mounted to the first light emitting tube 112a to measure the temperature of the first light emitting tube 112a.

A lamp state detecting system 710b has the same structure as the lamp state detecting system 710a, and has a temperature sensing element 712b disposed around the second light source device 110b. The lamp state detecting system 710b has the function of detecting, based on the detection result by the temperature sensing element 712b, whether the second light emitting tube 112b works or not.

The cooling fan control system 720 has the function of controlling, based on the power supplied to each of the first and second light emitting tubes 112a and 112b by the power control system 700, respectively, the rotation frequency of the first and second cooling fans 722a and 722b.

The first cooling fan 722a sends cooling wind around the first light source device 110a in accordance with the number of rotations controlled by the cooling fan control system 720, thereby cooling the first light source device 110a. The second cooling fan 722b, like the first cooling fan 722a, sends cooling wind around the second light source device 110b with the number of rotations controlled by the cooling fan control system 720, thereby cooling the second light source device 110b. The cooling wind that accomplished cooling of the first and second light source devices 110a and 110b is discharged by an exhausting fan (not shown) through an exhausting outlet (not shown) provided on the housing.

As described above, in the illuminating apparatus 100 according to the first exemplary embodiment, the power control system 700 has the function of controlling the power supplied to the first and second light emitting tubes 112a and 112b so that the following equation is satisfied:

$$W_1 > W_0$$

Therefore, the power supplied to the first light emitting tube 112a which works in case of the one-lamp-working state can be made larger than the power supplied to each of the first light emitting tube 112a and the second light emitting tube 112b in case of the two-lamp-working state, respectively. Accordingly, since the light amount from the first light emitting tube 112a which works in case of the one-lamp-working state can be larger than the light amount from each of the first light emitting tube 112a and the second light emitting tube 112b in case of the two-lamp-working state, respectively, even when the two-lamp-working state is changed to the one-lamp-working state, the illuminance in the illumination target area can be effectively prevented from being lowered. As a result, the brightness of the projection image can be effectively prevented from being lowered.

Accordingly, the illuminating apparatus 100 according to the first exemplary embodiment, even if light emission from the light emitting tube in either one of the two light source devices is weakened or stopped, distribution of in-plane light intensity on the illumination target area is prevented from being non-uniform, and the illuminance in the illumination target area can be effectively prevented from being lowered. As a result, an illuminating-apparatus is obtained by which the quality and brightness of the projection image can be effectively prevented from being degraded and lowered.

As described above, in the illuminating apparatus 100 according to the first exemplary embodiment, since each of the concave lenses 118a and 118b, each of the polarized light separation prisms 171 and 181, and the polarized light beam splitter 190 are disposed apart from each other, thermal effect against the concave lenses 118a and 118b of the polarized light separation prisms 171 and 181, and the polarized light beam splitter 190 can be reduced.

In the illuminating apparatus 100 according to the first exemplary embodiment, since the illuminating apparatus 100 is further equipped with the lamp state detection systems 710a and 710b for detecting whether each of the first and second light emitting tubes 112a and 112b works or not, it can be easily detected whether each of the first and second light emitting tubes 112a and 112b works or not (the lamp state).

In the illuminating apparatus 100 according to the first exemplary embodiment, since the cooling fan control system 720 has the function of controlling, based on the power to each of the first and second light emitting tubes 112a and 112b supplied by the power control system 700, respectively, the rotation frequency of the first and second cooling fans 722a and 722b, an excessive rinse in temperature in the first and second light emitting tubes 112a and 112b can be prevented. Accordingly, lifespan of each of the first and second light emitting tubes 112a and 112b can be prolonged.

The projector 1000 according to the first exemplary embodiment includes the illuminating apparatus 100 according to the first exemplary embodiment as described above; the liquid crystal devices 400R, 400G, 400B that modulate the light from the illuminating apparatus 100 in response to image information, and the projection optical system 600 that projects the light modulated by the liquid crystal devices 400R, 400G, 400B.

Accordingly, the projector 1000 according to the first exemplary embodiment is a projector of high luminance, and, even if light emission from the light emitting tube of either of the first and second light source devices 110a and 110b is weakened or stopped, degradation of the projection image quality can be prevented.

It is noted that in the illuminating apparatus 100 according to the first exemplary embodiment, although the values of $W_0$ and $W_1$ are set as shown in Table 1, the invention is not limited thereto, and, for example, a modification as described below may be possible.

First Modification

Table 2 is for explaining an illuminating apparatus 100a according to a modification of the first exemplary embodiment

TABLE 2

| Two-lamp-working state | | One-lamp-working state |
|---|---|---|
| Power $W_0$ supplied to each of the light emitting tubes 100 W | 2 $W_0$ 200 W | Power $W_1$ supplied to the light emitting tube which works 200 W |

In the illuminating apparatus 100a according to a first modification of the first exemplary embodiment, as shown in Table 2, the power $W_1$ supplied from the power control system 700 to the light emitting tube which works (the first light emitting tube 112a) in case of the one-lamp-working state is set to 200 W.

In other words, in the illuminating apparatus 100a according to the first modification of the first exemplary embodiment, the power control system 700 has a function of controlling the power supplied to the first and second light emitting tubes 112a and 112b so that the following equation is satisfied:

$$W_1 = 2W_0$$

Accordingly, in the illuminating apparatus 100a according to the first modification of the first exemplary embodiment, since the sum of the light amounts of the first and second light emitting tubes 112a and 112b in case of the two-lamp-working state can be made equal to the light amount of the first light emitting tube 112a which works in case of the one-lamp-working state, the illuminance in the illumination target area in case of the one-lamp-working state can be made approximately equal to the illuminance in the illumination target area in case of the two-lamp-working state. Therefore, even when the two-lamp-working state is changed to the one-lamp-working state, the illuminance in the illumination target area is prevented from being lowered, and thus, the brightness of the projection image is prevented from being lowered.

Furthermore, in the illuminating apparatus 100a according to the first modification of the first exemplary embodiment, when the two-lamp-working state is changed to the one-lamp-working state, the time required to change the power supplied from the power control system 700 to the first light emitting tube 112a is less than one frame period. Therefore, even when the one light emitting tube dies and the two-lamp-working state is changed to the one-lamp-working state, such fact can be made unnoticeable to an observer. As a result, since it is possible to prevent the situation in which the observer becomes unable to concentrate on the contents due to the fact that the one light emitting tube dies, the illuminating apparatus 100a in the first modification of the first exemplary embodiment is particularly useful as illuminating apparatuses utilized as projectors for business purposes used in theaters (including theaters corresponding to digital cinemas).

Second Exemplary Embodiment

Figure 8:
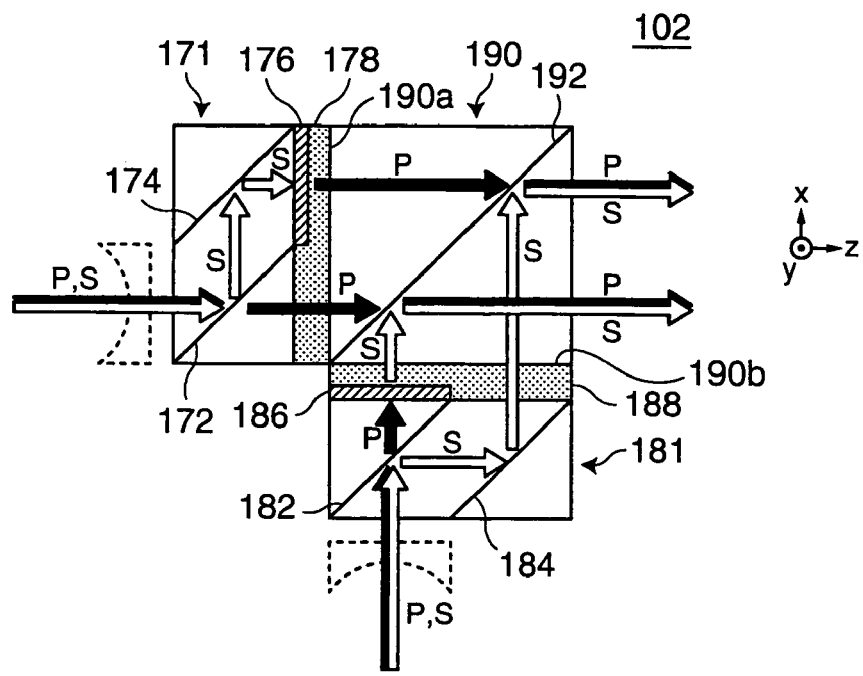
FIG. 8 is a schematic showing an essential part of the illuminating apparatus 102 according to the second exemplary embodiment.

FIG. 8 is a plan view showing an essential part of an illuminating apparatus 102 according to a second exemplary embodiment.

In the illuminating apparatus 102 according to the second exemplary embodiment, as shown in FIG. 8, the first light incident surface 190a of the polarized light beam splitter 190, the light emitting surface of the first polarized light separation prism 171 in the first polarized light source device 170 (not shown), and the λ/2 plate 176 are bonded through an optical adhesive 178. The second light incident surface 190b in the polarized light beam splitter 190, the light emitting surface of the polarized light separation prism 181 in the second polarized light source device 180 (not shown), and the λ/2 plate 186 are bonded through an optical adhesive 188.

Accordingly, in the illuminating apparatus 102 according to the second exemplary embodiment, since unnecessary reflections between each of the first and second polarized light source devices 170 and 180 and the polarized light beam splitter 190 are reduced, respectively, light utilization efficiency is improved and the level of stray light is reduced.

Third Exemplary Embodiment

Figure 9:
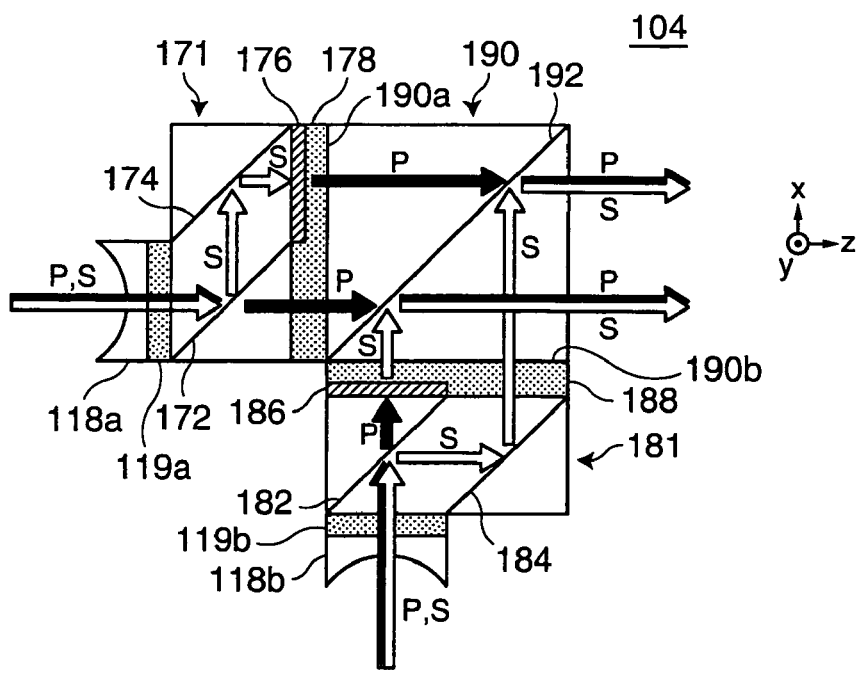
FIG. 9 is a schematic showing an essential part of the illuminating apparatus 104 in accordance with the third exemplary embodiment.
Figure 10:
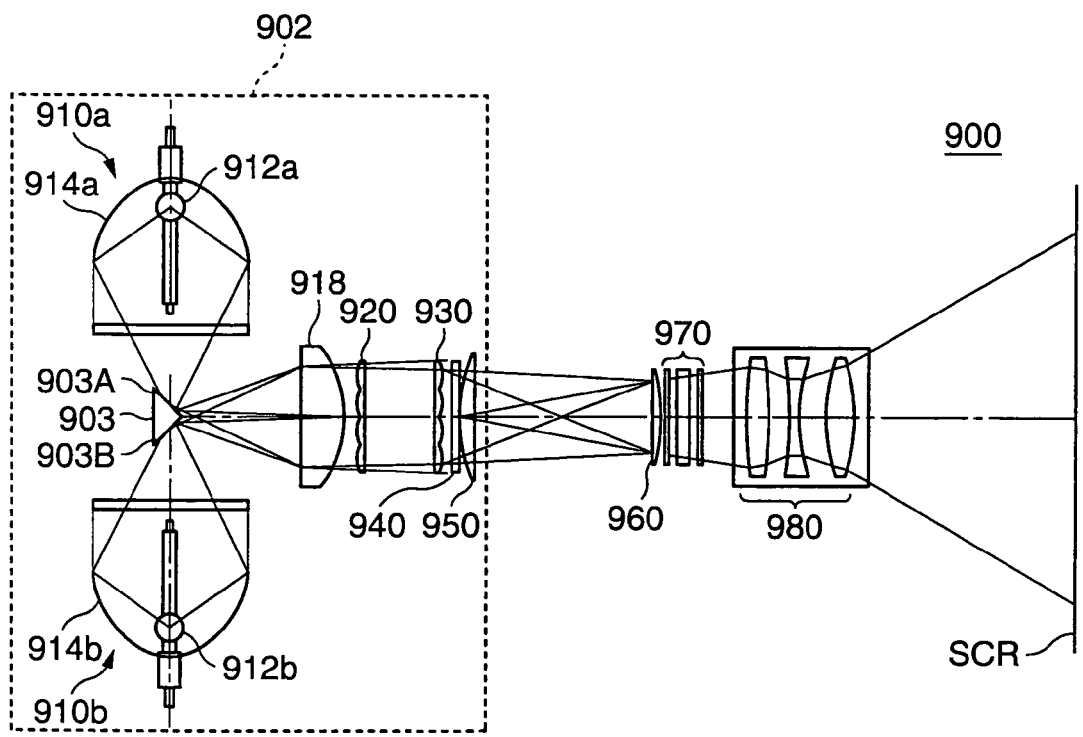
FIG. 10 is a schematic showing the two-lamp type projector 900 according to the related art.

FIG. 9 is a plan view showing an essential part of an illuminating apparatus 104 in accordance with the third exemplary embodiment.

In the illuminating apparatus 104 in accordance with the third exemplary embodiment, as shown in FIG. 9, the light incident surface of the first polarized light separation prism 171 in the first polarized light source device 170 (not shown) and the light emitting surface of the first concave lens 118a in the first light source device 110a are bonded through an optical adhesive 119a. The light incident surface of the second polarized light separation prism 181 in the second polarized light source device 180 (not shown) and the light emitting surface of the second concave lens 118b in the second light source device 110b are bonded through an optical adhesive 119b.

Accordingly, in the illuminating apparatus 104 in accordance with the third exemplary embodiment, since unnecessary reflections between the first polarized light separation prism 171 and the first concave lens 118a in the first light source device 110a, and between the second polarized light separation prism 181 and the second concave lens 118b in the second light source device 110b are reduced, light utilization efficiency is improved and the level of stray light is reduced.

Even though the illuminating apparatuses and the projectors of the invention have been described based on each of the above-described exemplary embodiments, the invention is not limited to each of the above-described exemplary embodiments. The invention can be implemented in a variety of forms without departing from the gist of the invention, including the following modifications.

Even though the projector 1000 according to the first exemplary embodiment relates to transmission type projectors, the invention is not limited thereto. The invention is also applicable to reflective type projectors. Here, the 'transmission type' indicates the type by which an electro-optical modulation device as an optical modulating system such as transmission type liquid crystal devices transmits light, whereas the 'reflection type' indicates the type by which an electro-optical modulation device as an optical modulating system such as reflective liquid crystal devices reflects light. The invention is also applicable to the reflection type projectors, with the same effect as the transmission type projectors.

Even though the projector 1000 according to the first exemplary embodiment uses liquid crystal devices as electro-optical modulation devices, the invention is not limited thereto. Generally, any devices that modulate incident light in response to image information may be used as electro-optical modulation devices, such as micro-mirror type light modulation devices, and the like. For example, Digital Micro-mirror Device ("DMD") Trademark of TI Inc.) may be used.

Even though the projector 1000 according to the first exemplary embodiment uses a light source device that has, as the first and second light source devices 110a and 110b, each of ellipsoidal reflectors 114a and 114b, each of light emitting tubes 112a and 112b having the light emitting center around the first focal point of each of the ellipsoidal reflectors 114a and 114b, and each of concave lenses 118a and 118b converting the convergent light reflected by each of the ellipsoidal reflectors 114a and 114b into the collimated light and emitting the collimated light toward the light incident surface of each of polarized light separation prisms, the invention is not limited thereto. Light source devices having parabolic reflectors and light emitting tubes with the light emitting centers around focal points of the parabolic reflectors can be used.

Even though the illuminating apparatus 100 according to the first exemplary embodiment uses, as a lamp state detection system, the lamp state detection systems 710a and 710b that detect the lamp state of each of the first and second light emitting tubes 112a and 112b by measuring the tempera of a part of each of the first and second light source devices 110a and 110b, the invention is not limited thereto. For example, the lamp state detecting system may detect the lamp state of the first and second light emitting tubes 112a and 112b by measuring the light amount of each of the first and second light emitting tubes 112a and 112b, or, it may detect the lamp state of the first and second light emitting tubes 112a and 112b by measuring the power consumption or current consumption of the first and second light emitting tubes 112a and 112b.

In addition, the invention is applicable both to a front projection type projector by which the projection images are projected from the observer side, and to a rear projection type projector by which the projection images are projected from the opposite side of the observer.

The priority applications Numbers JP2004-353658 and JP2005-268118 upon which this patent application is based is hereby incorporated by reference.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illuminating apparatus comprising:
   a polarized light beam splitter having a first light incident surface and a second light incident surface;
   a first polarized light source device disposed in front of the first light incident surface; and
   a second polarized light source device disposed in front of the second light incident surface;
   the first polarized light source device having:
      a first light source device that emits approximately parallel illuminating light flux;
      a first polarized light separation prism that has a first polarized light separation surface which, among the approximately parallel illuminating light flux emitted from the first light source device, transmits illuminating light flux having a first polarized light component and reflects illuminating light flux having a second polarized light component, and a first reflective surface that reflects the illuminating light flux having the second polarized light component from the first polarized light separation surface toward a direction parallel to the illuminating light flux having the first polarized light component; and
      a first polarization element, provided on the light path of the illuminating light flux having the second polarized light component, that converts the illuminating light flux having the second polarized light component to illuminating light flux having the first polarized light component to emit,
   the first polarized light source device emitting the illuminating light flux from the first light source device toward the first light incident surface of the polarized light beam splitter as the illuminating light flux having the first polarized light component;
   the second polarized light source device having:
      a second light source device that emits approximately parallel illuminating light flux;
      a second polarized light separation prism that has a second polarized light separation surface which, among the approximately parallel illuminating light flux from the second light source device, transmits illuminating light flux having the first polarized light component and reflects illuminating light flux having the second polarized light component, and a second reflective surface that reflects the illuminating light flux having the second polarized light component from the second polarized light separation surface toward a direction parallel to the illuminating light flux having the first polarized light component; and
      a second polarization element, provided on the light path of the illuminating light flux having the first polarized light component, that converts the illuminating light flux having the first polarized light component to illuminating light flux having the second polarized light component to emit,
   the second polarized light source device emits the illuminating light flux from the second light source device toward the second light incident surface of the polarized light beam splitter as the illuminating light flux having the second polarized light component;
   the illuminating light flux having the first polarized light component emitted from the first polarized light source device and illuminating light flux having the second polarized light component emitted from the second polarized light source device being both linear polarized light components and having different polarized light axis from each other;
   the polarized light beam splitter synthesizes the illuminating light flux having the first polarized light component emitted from the first polarized light source device and the illuminating light flux having the second polarized light component emitted from the second polarized light source device to emit;
   the first light source device having a first ellipsoidal reflector, a first light emitting tube having the light emitting center around the first focal point of the first ellipsoidal reflector, and a first concave lens emitting convergent light from the first ellipsoidal reflector toward the light incident surface in the first polarized light separation prism; and
   the second light source device having a second ellipsoidal reflector, a second light emitting tube having the light emitting center around the first focal point of the second ellipsoidal reflector, and a second concave lens emitting convergent light from the second ellipsoidal reflector toward the light incident surface in the second polarized light separation prism.

2. An illuminating apparatus according to claim 1, the first light emitting tube being provided with a first reflector that reflects the light emitted from the first light emitting tube to the illumination target area toward the first ellipsoidal reflector, and the second light emitting tube being provided with a second reflector that reflects the light emitted from the second light emitting tube to the illumination target area toward the second ellipsoidal reflector.

3. An illuminating apparatus according to claim 1, the first light incident surface of the polarized light beam splitter being bonded to the light emitting surface in the first polarized light source device; and the second light incident surface of the polarized light beam splitter being bonded to the light emitting surface in the second polarized light source device.

4. An illuminating apparatus according to claim 1, the light incident surface of the first polarized light separation prism being bonded to the light emitting surface of the first concave lens in the first light source device; and the light incident surface of the second polarized light separation prism being bonded to the light emitting surface of the second concave lens in the second light source device.

5. An illuminating apparatus according to claim 1, the polarized light beam splitter and the first polarized light separation prism, the first polarized light separation prism and the first concave lens, the polarized light beam splitter and the second polarized light separation prism, and the second polarized light separation prism and the second concave lens, being disposed apart from each other.

6. An illuminating apparatus according to claim 1, further comprising:

a power control system that controls the power supplied to the first light emitting tube and the second light emitting tube;

when W0 denotes the power supplied from the power control system to each of the first light emitting tube and the second light emitting tube, respectively, in case the first and second light emitting tubes work, and W1 denotes the power supplied from the power control system to the other light emitting tube which works in case either the first or second light emitting tubes does not work, the power control system having the function of controlling the power supplied to the first and second light emitting tubes so that the following equation is satisfied:

W1>W0.

7. An illuminating apparatus according to claim 6, the power control system having a function of controlling the power supplied to the first and second light emitting tubes so that the following equation is satisfied:

W1=2W0.

8. An illuminating apparatus according to claim 6, further comprising:

a lamp state detecting system that detects whether each of the first and second light emitting tubes works or not.

9. A projector, comprising:

the illuminating apparatus according to claim 1;

an electro-optical modulation device that modulates the light from the illuminating apparatus in response to image information; and a projection optical system that projects the modulated light by the electro-optical modulation device.

10. A projector according to claim 9, the first light emitting tube being provided with a first reflector that reflects the light emitted from the first light emitting tube to the illumination target area toward the first ellipsoidal reflector, and the second light emitting tube being provided with a second reflector that reflects the light emitted from the second light emitting tube to the illumination target area toward the second ellipsoidal reflector.

11. A projector according to claim 9, the first light incident surface of the polarized light beam splitter being bonded to the light emitting surface in the first polarized light source device; and the second light incident surface of the polarized light beam splitter being bonded to the light emitting surface in the second polarized light source device.

12. A projector according to claim 9, the light incident surface of the first polarized light separation prism being bonded to the light emitting surface of the first concave lens in the first light source device; and the light incident surface of the second polarized light separation prism being bonded to the light emitting surface of the second concave lens in the second light source device.

13. A projector according to claim 9, the polarized light beam splitter and the first polarized light separation prism, the first polarized light separation prism and the first concave lens, the polarized light beam splitter and the second polarized light separation prism, and the second polarized light separation prism and the second concave lens, being disposed apart from each other.

14. A projector according to claim 9, further comprising:

a first lens array that has a plurality of first small lenses that divide the light emitted from the polarized light beam splitter into a plurality of partial light flux;

a second lens array that has a plurality of second small lenses corresponding to the plurality of first small lenses of the first lens array;

a polarization optical system that aligns the partial light flux from the second lens array into one type of linear polarized light; and a superposing lens that superposes the light from the polarization optical system onto the illumination target area.

15. A projector according to claim 9, further comprising:

a power control system that controls the power supplied to the first light emitting tube and the second light emitting tube;

when W0 denotes the power supplied from the power control system to each of the first light emitting tube and the second light emitting tube, respectively, in case the first and second light emitting tubes work, and W1 denotes the power supplied from the power control system to the other light emitting tube which works in case either the first or second light emitting tubes does not work, the power control system having the function of controlling the power supplied to the first and second light emitting tubes so that the following equation is satisfied:

W1>W0.

16. A projector according to claim 15, the power control system having a function of controlling the power supplied to the first and second light emitting tubes so that the following equation is satisfied:

W1=2W0.

17. A projector according to claim 15, further comprising:

a lamp state detecting system that detects whether each of the first and second light emitting tubes works or not.

18. A projector according to claim 15, further comprising:

a first cooling fan that cools the first light source device;

a second cooling fan that cools the second light source device; and a cooling fan control system that controls a rotation frequency of the first and second cooling fans, the cooling fan control system having a function of controlling the rotation frequency of the first and second cooling fans based on the power supplied to each of the first and second light emitting tubes by the power control system.

* * * * *